United States Patent
Peles (10) Patent No.: US 7,769,994 B2
(45) Date of Patent: Aug. 3, 2010

(54) CONTENT INSPECTION IN SECURE NETWORKS

(75) Inventor: Amir Peles, Tel Aviv (IL)

(73) Assignee: Radware Ltd., Tel-Aviv (IL)

( * ) Notice: Subject to any disclaimer, the term of this patent is extended or adjusted under 35 U.S.C. 154(b) by 1300 days.

(21) Appl. No.: 10/910,238

(22) Filed: Aug. 3, 2004

(65) Prior Publication Data

US 2005/0050362 A1    Mar. 3, 2005

Related U.S. Application Data

(60) Provisional application No. 60/494,763, filed on Aug. 13, 2003.

(51) Int. Cl.
*G06F 11/30* (2006.01)
(52) U.S. Cl. .................. 713/153; 726/11; 726/17; 713/151; 713/175
(58) Field of Classification Search .......... 713/151, 713/153, 154, 160, 173, 175, 176; 726/2, 726/11, 17, 21
See application file for complete search history.

(56) References Cited

U.S. PATENT DOCUMENTS 5,548,646 A * 8/1996 Aziz et al. ............... 713/153
5,884,025 A * 3/1999 Baehr et al. ............... 726/13
6,636,838 B1* 10/2003 Perlman et al. ............ 705/51
6,732,269 B1* 5/2004 Baskey et al. ............. 713/153
7,350,229 B1* 3/2008 Lander ...................... 726/8
2002/0062372 A1* 5/2002 Hong et al. ............... 709/225
2004/0111642 A1* 6/2004 Peles ........................ 713/201
2006/0029016 A1* 2/2006 Peles ........................ 370/328

OTHER PUBLICATIONS

InfoTesys Computer Consulting GmbH. Tommy SSL-Proxy. Content Protection of SSL-Coded Data. Tommy SSL-Proxy, Oct. 2002.
MicroDasys. Microdasys SCIP-Proxy v2.15 pp. 1-72.

* cited by examiner

*Primary Examiner*—Benjamin E Lanier
*Assistant Examiner*—Hadi Armouche
(74) *Attorney, Agent, or Firm*—Katten Muchin Rosenman LLP (57) ABSTRACT

A secure access system is used to connect an internal network, such as a private LAN, to an external network, such as the Internet. The system is provided with internal and external gateways, for connecting to the respective networks, as well as an inspection evaluator, content inspector, internal certificate authority, internal SSL terminator and external SSL initiator. Packets routed through the access system are inspected before they are forwarded from one gateway to the other, except those packets of designated users of the internal network which are directly forwarded without inspection. Encrypted packets received by the access system are decrypted, inspected, and then re-encrypted before they are forwarded.

27 Claims, 10 Drawing Sheets

CONTENT INSPECTION IN SECURE NETWORKS

CROSS REFERENCE TO RELATED APPLICATIONS

This application claims the benefit from U.S. provisional application 60/494,763 filed on Aug. 13, 2003.

BACKGROUND OF THE INVENTION

1. Field of Invention

The present invention relates generally to the field of content inspection. More specifically, the present invention is related to content inspection of encrypted network traffic.

2. Discussion of Prior Art

Businesses have increasingly started using networks, such as the Internet, as a tool for facilitating communications and advancing commerce. Employees in a business use the Internet to communicate with customers and suppliers in a relatively inexpensive manner. Employees also use the Internet to gather information to keep up-to-date with the market and educate themselves with new technologies and products, thereby saving valuable research time and money.

Encryption is used as a means for guarantying privacy in communications over a public network such as the Internet. A popular encryption protocol used over the Internet is the Secure Sockets Layer (SSL) protocol. SSL was developed by Netscape® for transmitting private documents via the Internet. SSL works by using a private key to encrypt data that's transferred over the SSL connection. Both Netscape Navigator™ and Internet Explorer™ support SSL, and many Web sites use the protocol to obtain confidential user information, such as credit card numbers. By convention, URLs that require an SSL connection start with "HTTPS:" instead of "HTTP:".

Figure 1:
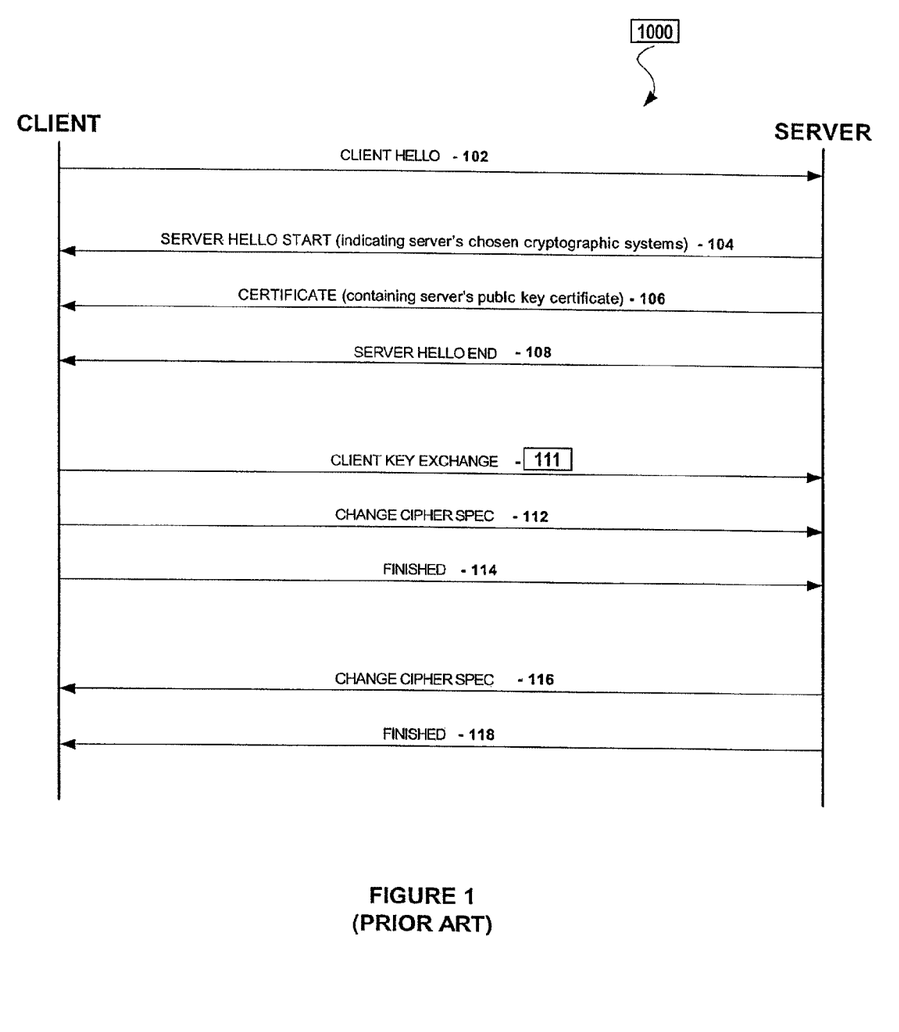
FIG. 1 illustrates a time-line diagram of a typical SSL session.

FIG. 1 illustrates a time-line diagram of a typical SSL session 1000. First, in step 102, the user contacts the server (for establishing a secure connection) by sending a "CLIENT HELLO" message. The client identifies, to the server, the various cryptographic systems it can support. In response, in step 104, the server sends a "SERVER HELLO" message with the server's chosen cryptographic system. Next, in step 106, the server sends a certificate message containing the server's Public Key Certificate. The user can verify that the certificate belongs to the server through a certificate authority (a third party) that approves the certificate. In step 108, the server notifies the client that the "SERVER HELLO" message has ended. In step 111, the client sends a "CLIENT KEY EXCHANGE" that contains a random sequence of numbers that have been encrypted using the server's public key, wherein the encrypted data becomes the new secret key. In step 112, the client sends a "CHANGE CIPHER SPEC" that notifies the server that all subsequent communications will be encrypted. Next, in step 114, the client sends a "FINISHED" message notifying the server that it has completed the handshake message.

In step 116, the server sends a "CHANGE CIPHER SPEC" that notifies the client that all subsequent communications will be encrypted, and, in step 118, the server sends a "FINISHED" message notifying the server that it has completed the handshake exchange. After establishing a session as per FIG. 1, a client and a server can start communicating in a secure manner via the SSL protocol.

Access to a public network, such as the Internet, presents several problems from a company's perspective. For example, there are at least two issues that need to be addressed by a company. First, while accessing the Internet, the users are vulnerable to attacks (e.g., viruses) that can damage the company's data and infrastructure. Second, employees have unrestricted access to the Internet and there is no check on their access to information not pertinent to work, which results in the improper usage of both an employee's time and a company's communication bandwidth. Hence, it would be beneficial for a company to prevent attacks on its infrastructure and limit unnecessary bandwidth usage.

Filtering gateways have been used in the prior art for protecting employees from vulnerabilities and limiting their access to proper resources. Such gateways are placed in the edge of the company network, such that the relevant part of the communication that requires inspection goes through the gateway. The gateway checks the traffic and knows to block or report on any illegal traffic that arrives through it, either from the internal network or back from the Internet. This application is easy to install and manage, but it has many limitations. One drawback with prior art filtering gateways is that secure transactions cannot be inspected because much of the content is encrypted.

Another prior art approach involves the use of host-based software that is installed on each of the employee's personal computer (PC). A pitfall associated with this approach is that this option is hard to manage because each PC can have a different operating system, thereby causing problems during installation of the host-based software. Another pitfall is that previously installed software resident on a PC can conflict with the newly installed host-based filtering software, potentially rendering the host-based software ineffective. Furthermore, a lot of time and effort is involved in updating the host-based filtering software in each PC when new inspection logic is available.

The following references provide for a general teaching in the area of content security and inspection, but they fail to provide for many of the limitations of the present invention.

The U.S. patent publication 2003/0084279 A1 to Campagna teaches a monitoring system for a corporate network, wherein cryptographically protected data is routed through a monitoring server as part of its exchange between a client and a server. The monitoring server analyzes decoded data to determine the presence/absence of "suspect" data. The monitoring server has virus scanning and a firewall/filtering capability resident within which are used to detect viruses and data that a corporation does not want transmitted outside the corporate network.

U.S. Pat. No. 6,636,838 to Perlman et al. provides for a system that performs content screening, via a content screener located within a firewall, on a message that is protected by end-to-end encryption. The content screener in the firewall screens incoming messages for harmful code, such as a computer virus. It can also screen the message to detect a policy violation within the message, such as receiving a communication from a non-work-related source. U.S. Pat. Nos. 6,560,705 and 6,546,486 also appear to provide a similar teaching.

The U.S. Pat. No. 5,884,025 to Baehr et al. discloses a screening system for screening data packets transmitted between a network to be protected, such as a private network, and another network, such as a public network. Packets received at the screening system are filtered based upon their contents, state information and other criteria, including their source and destination. The packets may be allowed through, with or without alteration of their data, IP address, etc; or the packets may be dropped, with or without an error message generated to sender of the packets.

The U.S. Pat. No. 6,393,568 to Ranger et al. teaches a computer-based encryption and decryption system that provides content analysis through a content inspection mechanism. The content inspection mechanism analyzes decrypted content for things such as virus patterns, keywords, unknown program format, or any other content-based criteria.

The U.S. Pat. No. 6,701,432 to Deng et al. provides for a gateway that includes a firewall engine for screening packets transferred over a network. The firewall engine is operable to retrieve packets from memory and screen each packet prior to forwarding a given packet through the gateway.

Whatever the precise merits, features, and advantages of the above cited references, they fail to achieve or fulfill the purpose of the present invention.

SUMMARY OF THE INVENTION

The present invention provides for a secure access system and method that offers a central inspection solution which inspects secure transactions between a client and a server (such as between a company employee and Internet servers). In the exemplary embodiment, wherein the system is used between an internal network and an external network, the system comprises: an internal gateway, an internal SSL terminator, an internal certificate authority, an inspection evaluator, a content inspector, an external SSL initiator, an external gateway, and an intelligent network switch. When internal users request (i.e., users associated with an internal network) a connection to an external network, the internal gateway checks the attributes of the requested connection to see if an encrypted connection is requested. The internal gateway forwards clear traffic (i.e., un-encrypted traffic) to the inspection evaluator, whereas encrypted traffic is forwarded to the internal SSL terminator for decryption. It should be noted that certain users associated with the internal network do not require content inspection, no matter whether the connection is encrypted or not. The internal gateway receives connections from these users and forwards them directly to the external gateway.

Responses from servers (associated with an external network) are routed to clients (associated with the internal network) via the internal gateway. Clear responses (i.e., un-encrypted traffic) are forwarded to the internal gateway from the inspection evaluator and encrypted responses arrive from the internal SSL terminator. Responses for requests that do not require inspection (i.e., requests for users who don't require content inspection) arrive directly from the external gateway. The internal gateway forwards the received responses to appropriate users associated with the internal network.

The internal SSL terminator receives encrypted traffic coming from the internal network, wherein the internal SSL terminator acts as the destination server and establishes the secure connection on behalf of an external server. In other words, the internal SSL terminator establishes a secure connection with said at least one client (of internal network) and impersonates an external server. The internal SSL terminator supplies a user (associated with internal network) with a public key and a certificate, and negotiates the encryption scheme and keys with the user, to establish an SSL connection. During this phase, the user may request an authorization of the server's identity. This is handled by the internal certificate authority, which acts as the authority for approving server certificates. Since the internal SSL terminator replaces an external server as the termination point of the SSL connection, it requires the internal certificate authority to approve the internal SSL terminator identity as the destination server.

For this, the internal certificate authority creates a general certificate for internal SSL terminator that approves any external server identity. After establishing a secure connection, the client sends its request. The internal SSL terminator decrypts the request and returns the clear request to the inspection evaluator. The internal SSL terminator also receives clear responses for these encrypted requests. Upon arrival of a clear response, the internal SSL terminator encrypts it and sends it back to the internal gateway.

The inspection evaluator receives clear requests from the internal gateway and the internal SSL terminator, and clear responses from the external gateway and the external SSL initiator. The inspection evaluator makes a decision regarding whether the content of the request or the content of the response needs inspection. Such a decision can involve any of the traffic attributes. If a decision is made that inspection is required, the inspection evaluator forwards the request or response to the content inspector. When the requests and responses come back after verification, the inspection evaluator forwards them on to either the internal or external gateways. If a decision is made that inspection is not required, the inspection evaluator forwards the requests and responses similarly.

The content inspector receives clear requests from the user-side and clear responses from the server-side, wherein such requests/responses are inspected for enforcing network security. The content inspector checks the validity of the communication by verifying the user's request and inspecting the server response for any attack or virus signature or any other rule that defines which requests/replies are valid and which are not. For any invalid content, the content inspector issues an error message to the user or just resets the session between the user and a server. After validating the requests or responses, they are passed back to the inspection evaluator.

The external SSL initiator receives clear requests from the inspection evaluator and the external SSL initiator detects the external destination server of the request and opens an SSL connection with that external server in order to encrypt the communication on behalf of the user. After establishing the secure connection, the external SSL initiator encrypts the request and sends it to the external server. It should be noted that communications with the server are done via the external gateway. When an encrypted response arrives from the external gateway, the external SSL initiator decrypts it and passes the clear response to inspection evaluator. The external gateway receives clear requests from the inspection evaluator and encrypted requests from the external SSL initiator. The external gateway also receives, from the internal gateway, requests that do not require inspection. All such requests are forwarded to the external network, towards their actual destination server. The external gateway keeps track of each request and waits for its response to return from the external network.

When the external gateway receives the responses from the external network, it links each response to its original request. Such links are based upon similar traffic attributes of the request and the reply. If the original request came from the internal gateway without any inspection, the external gateway sends the response back to the internal gateway. If the original request was encrypted by the external SSL initiator, the response is forwarded to the external SSL initiator to be decrypted. If the original request came from the inspection evaluator, the response is forwarded back to the inspection evaluator.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
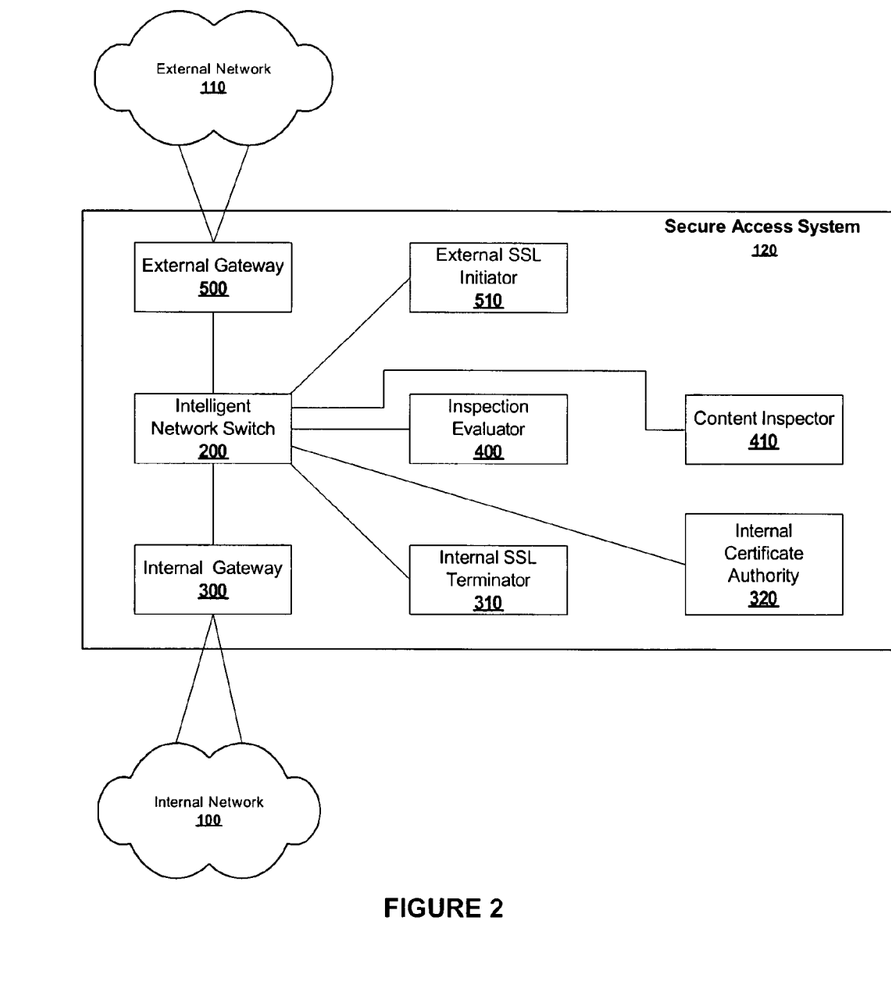
FIG. 2 illustrates an exemplary embodiment of the present invention's system.

The present invention provides for a secure access system and method that offers a central inspection solution which inspects secure transactions between a client and a server (such as between a company employee and Internet servers). FIG. 2 illustrates an exemplary embodiment of the present invention's system 120, wherein system 120 is used between an internal network 100 and an external network 110 and comprises: an internal gateway 300, an internal SSL terminator 310, an internal certificate authority 320, an inspection evaluator 400, a content inspector 410, an external SSL initiator 510, an external gateway 500, and an intelligent network switch 200. The internal network can be a company network or a provider network, or any other network with its users. The external network can be the Internet or any other network with its servers.

It should be noted that although FIG. 2 depicts individual system elements residing within a single device 120, multiple devices with one or more of the above-identified units are within the scope of the present invention. Furthermore, multiple concurrent active instances of each system element are also envisioned to be within the scope of the present invention. It should be also noted that although the specific example of SSL is used in the present invention, variations in the SSL protocol or future security protocols should not limit the scope of the present invention. Additionally, while the examples and descriptions are provided from an enterprise's perspective, the same logic and system is also relevant to any network utilized by users to access data, including a service provider network and a carrier network.

Internal gateway 300 receives the traffic coming from internal network 100 and waits for new requests originating from clients that have access to internal network 100. When internal users request a connection to external network 110, internal gateway 300 checks the attributes of the requested connection to see if an encrypted connection is requested. Internal gateway 300 forwards clear traffic (i.e., un-encrypted traffic) to inspection evaluator 400, whereas encrypted traffic is forwarded to internal SSL terminator 310 for decryption.

Figure 3:
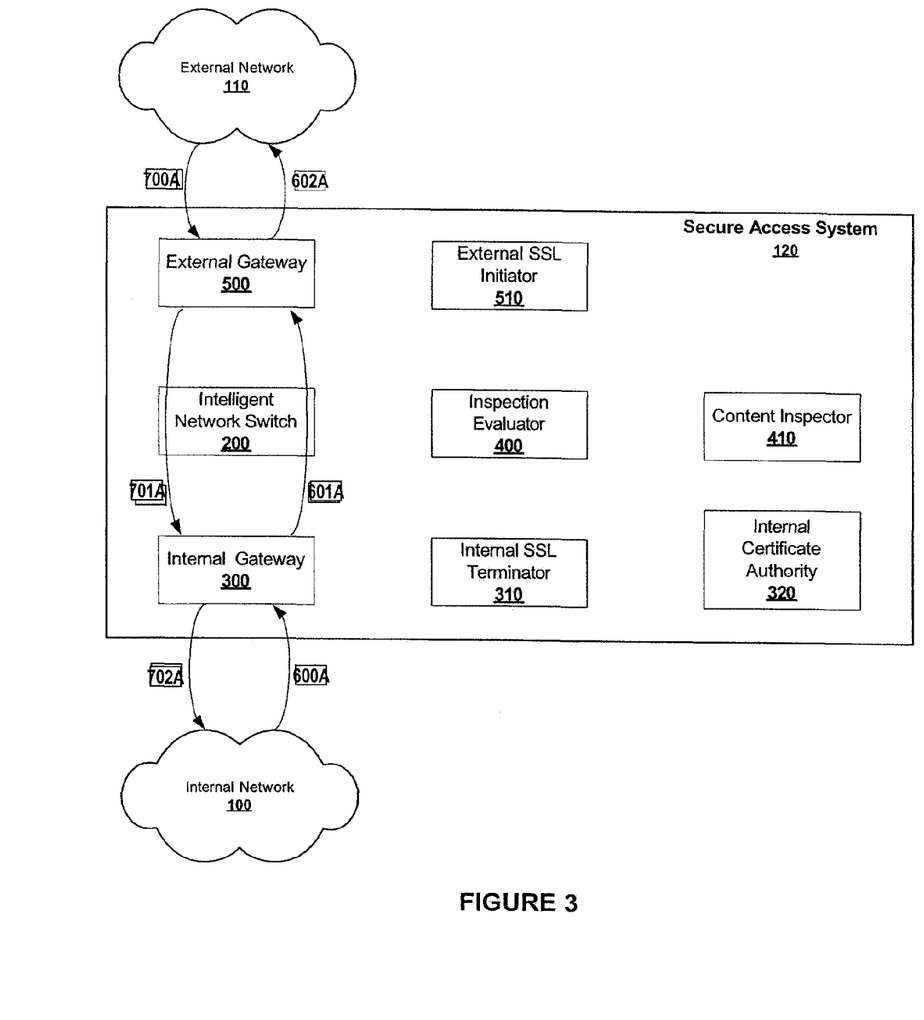
FIG. 3 illustrates how non-inspected traffic is handled by the present invention's system.

Certain users associated with internal network 100 do not require content inspection, no matter whether the connection is encrypted or not. Internal gateway 300 receives connections from these users and forwards them directly to external gateway 500. FIG. 3 illustrates how non-inspected traffic is handled in system 120. Request 600A arrives from internal network 100 to internal gateway 300. Internal gateway 300 decides that the traffic does not require inspection and forwards request 601A to external gateway 500. External gateway 500 keeps the request identifiers in a session table and forwards request 602A to external network 110. Response 700A arrives at external gateway 500 that identifies it in its session table (based on information that was recorded when the request came from internal gateway 300). External gateway 500 forwards the response 701A to internal gateway 300. Internal gateway 300 forwards the response 702A to internal network 100.

Responses from servers (associated with the external network) are routed to clients (associated with the internal network) via the internal gateway 300. Clear responses (i.e., un-encrypted traffic) are forwarded to internal gateway 300 from inspection evaluator 400. Encrypted responses arrive from the internal SSL terminator. Responses for requests that do not require inspection (i.e., requests for users who don't require content inspection) arrive directly from external gateway 500. Internal gateway 300 forwards the received responses to appropriate users associated with internal network 100.

Internal gateway 300 keeps a list of rules that defines the traffic classification attributes for encrypted and clear traffic, and for users that don't require inspection. Such classification is based on any attribute of the connection. For example, such classification can be, but should not be limited to: checking the internal user address, the external server address, the application port number, or the requested content.

Figure 4A:
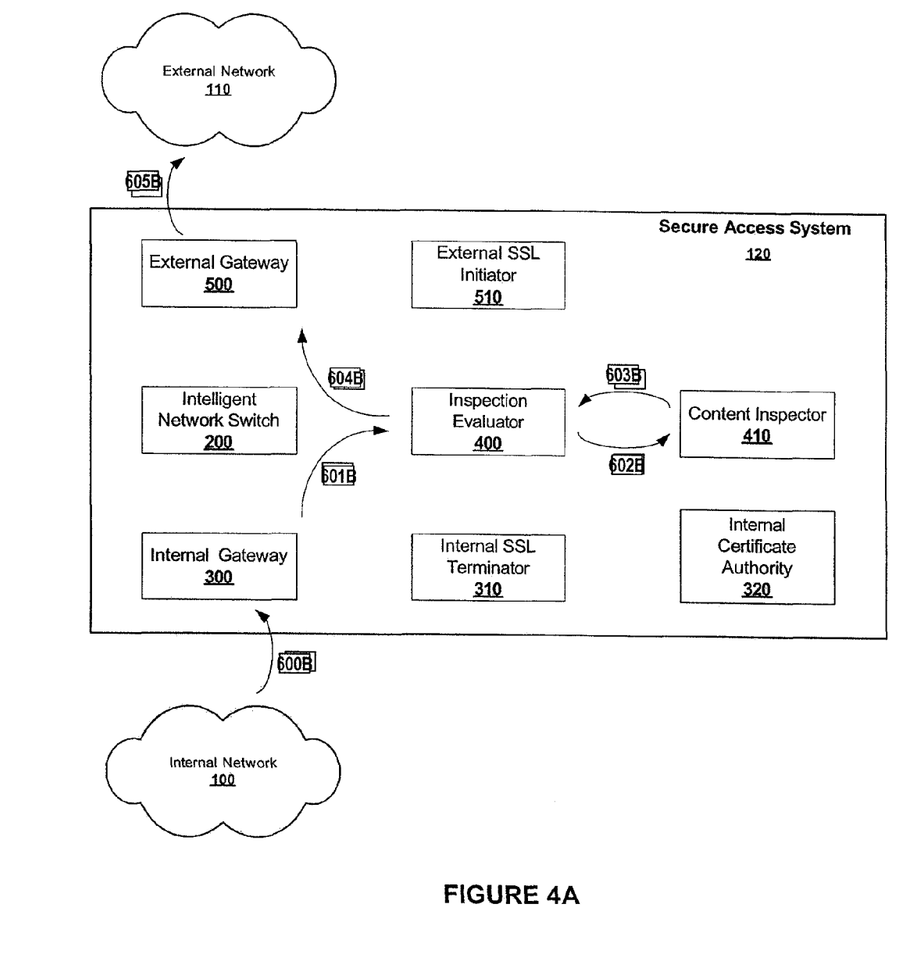
FIGS. 4a and 4b illustrate how "clear" traffic is inspected by the system of the present invention.

FIGS. 4a and 4b illustrate how clear traffic is inspected by the system of the present invention. FIG. 4a shows the handling of clear requests in system 120. Request 600B arrives from internal network 100 to internal gateway 300. Internal gateway 300 classifies the traffic as a clear traffic that requires classification and forwards request 601B to inspection evaluator 400. Inspection evaluator 400 decides that the request may carry content for inspection, and forwards request 602B to content inspector 410. Content inspector 410 verifies the content and forwards request 603B back to inspection evaluator 400. Inspection evaluator 400 knows that the request originally came from internal gateway 300, and forwards request 604B to external gateway 500. External gateway 500 forwards the request 605B to external network 110. If content inspector 410 does not allow the request to be sent, then it may drop the request; or content inspector 410 may respond to the requestor with an error message. If the inspection evaluator 400 decides that the request 601B does not require content inspection, it bypasses the step of sending the request to content inspector 410 and just forwards it directly to external gateway 500.

Figure 4B:
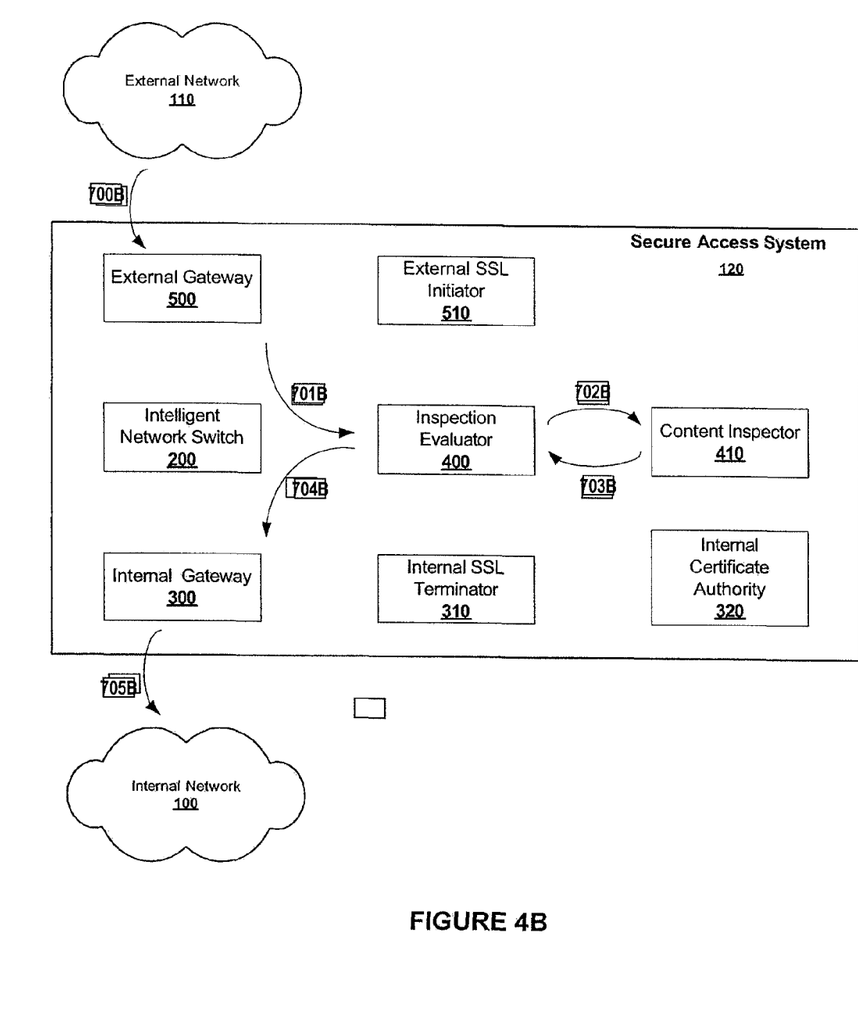

FIG. 4b illustrates how clear responses are handled in system 120. Response 700B arrives from external network 110 to external gateway 500. External gateway 500 recognizes the session as a clear traffic that requires inspection and forwards response 701B to inspection evaluator 400. Inspection evaluator 400 decides that response 702 may carry content for inspection, and forwards response 702B to the content inspector 410. Content inspector 410 verifies the content, clears it from vulnerabilities (if these exist), and forwards response 703B back to inspection evaluator 400. Inspection evaluator 400 is aware that the response originally came from the external gateway 500 and forwards response 704B to the internal gateway 300. Internal gateway 300 forwards the response 705B to internal network 100. If content inspector 410 does not allow the response to be sent, then it may just drop the response, or it may reset the session on both the client and server side by generating TCP RST packets for the session. If inspection evaluator 400 decides that response 701B does not require content inspection, it bypasses the step of sending the response to the content inspector and just forwards it directly to internal gateway 300.

Internal SSL terminator 310 receives encrypted traffic coming from internal network 100, wherein internal SSL terminator 310 acts as the destination server and establishes the secure connection on behalf of an external server. In other words, the internal SSL terminator establishes a secure connection with said at least one client (of internal network) and impersonates an external server. Internal SSL terminator 310 supplies a user (associated with internal network 100) with a public key and a certificate, and negotiates the encryption scheme and keys with the user, to establish an SSL connection. During this phase, the user may request an authorization of the server's identity. This is handled by internal certificate authority 320 as described below.

After establishing a secure connection, the client sends its request. Internal SSL terminator 310 decrypts the request and returns the clear request to the inspection evaluator 400. Internal SSL terminator 310 also receives clear responses for these encrypted requests. Upon arrival of a clear response, internal SSL terminator 310 encrypts it and sends it back to internal gateway 300.

Internal certificate authority 320 acts as the authority for approving server certificates. Since internal SSL terminator 310 replaces an external server as the termination point of the SSL connection, it requires the internal certificate authority to approve the internal SSL terminator identity as the destination server. For this, the internal certificate authority creates a general certificate for internal SSL terminator 310 that approves any external server identity. The internal certificate authority publishes its own root certificate, including its public key to all the users. When a user (associated with internal network 100) receives such a certificate from internal SSL terminator 310, the user can use the public key of internal certificate authority 320 to approve the server and continue with the transaction.

Inspection evaluator 400 receives clear requests from internal gateway 300 and internal SSL terminator 310, and clear responses from external gateway 500 and external SSL initiator 510. Inspection evaluator 400 makes a decision regarding whether the content of the request or the content of the response needs inspection. Such a decision can involve any of the traffic attributes. If a decision is made that inspection is required, inspection evaluator 400 forwards the request or response to content inspector 410. When the requests and responses come back after verification the inspection evaluator forwards them on to either the internal gateway 300 or external gateway 500. If a decision is made that inspection is not required, inspection evaluator 400 forwards the requests and responses similarly.

Requests that come via internal gateway 300 pass to external gateway 500. Requests that come from internal SSL terminator 310 are passed to external SSL initiator 510. Responses that came from external gateway 500 are passed to internal gateway 300. Responses that come from external SSL initiator 510 are passed to internal SSL terminator 310.

To manage this functionality, inspection evaluator 400 keeps a user inspection rules table that defines the relevant inspection policies for any internal user and external server. The inspection policies are kept in the content inspection policy table that defines the classification attributes for content that requires inspection. For example, performing an inspection may depend on the user address, the server address, the application port number, the requested URL, the requested file type or any parameter field in the request or response.

Content inspector 410 receives clear requests from the user-side and clear responses from the server-side, wherein such requests/responses are inspected for enforcing network security. Content inspector 410 checks the validity of the communication by verifying the user's request and inspecting the server response for any attack or virus signature or any other rule that defines which requests/replies are valid and which are not. For any invalid content, content inspector 410 issues an error message to the user or just resets the session between the user and a server. After validating the requests or responses, they are passed back to inspection evaluator 400.

External SSL initiator 510 receives clear requests from inspection evaluator 400 and external SSL initiator 510 detects the external destination server of the request and opens an SSL connection with that external server in order to encrypt the communication on behalf of the user. After establishing the secure connection, external SSL initiator 510 encrypts the request and sends it to the external server. It should be noted that communication with the server are done via external gateway 500. When an encrypted response arrives from external gateway 500, external SSL initiator 510 decrypts it and passes the clear response to inspection evaluator 400.

External gateway 500 receives clear requests from inspection evaluator 400 and encrypted requests from external SSL initiator 510. External gateway 500 also receives, from internal gateway 300, requests that do not require inspection. All such requests are forwarded to external network 110, towards their actual destination server. External gateway 500 keeps track of each request and waits for its response to return from the external network.

When external gateway 500 receives the responses from external network 110, it links each response to its original request. Such links are based upon similar traffic attributes of the request and the reply. If the original request came from internal gateway 300 without any inspection, external gateway 500 sends the response back to internal gateway 300. If the original request was encrypted by external SSL initiator 510, the response is forwarded to external SSL initiator 510 to be decrypted. If the original request came from inspection evaluator 400, the response is forwarded back to inspection evaluator 400.

To manage this functionality, external gateway 500 keeps a table of existing connections in the system, such that information regarding every request is maintained (i.e., regarding where it came from, and all its attributes) so that when a response comes back from external network 110, it is easy to link the response to the original request.

Figure 5A:
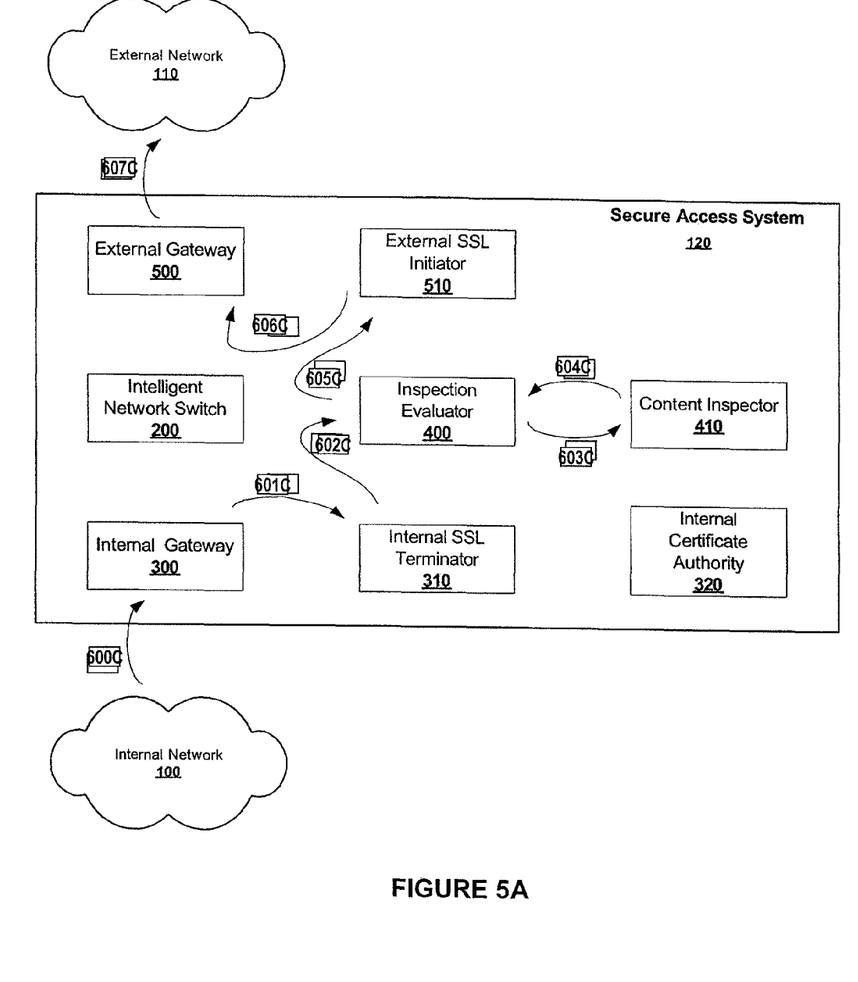
FIGS. 5a and 5b illustrate how encrypted traffic is inspected by the system of the present invention.

FIGS. 5a and 5b illustrate how encrypted traffic is inspected by the system of the present invention. FIG. 5a illustrates the handling of encrypted requests in system 120. Request 600C arrives from internal network 100 to the internal gateway 300. Internal gateway 300 classifies the traffic as an encrypted traffic that requires classification and forwards request 601C to internal SSL terminator 310. Internal SSL terminator 310 exchanges the encryption parameters with the user, and starts an encrypted SSL session with the user. Internal SSL terminator 310 receives the request and decrypts it. Then, internal SSL terminator 310 forwards the clear request 602C to inspection evaluator 400. Inspection evaluator 400 decides that the request may carry content for inspection, and forwards the request 603C to content inspector 410. Content inspector 410 verifies the content and forwards request 604 back to inspection evaluator 400. Inspection evaluator 400 knows that the request originally came from internal SSL terminator 310, and forwards the request 605C to external SSL initiator 510. External SSL initiator 510 opens an SSL connection with the destination server. After establishing the SSL session, external SSL initiator 510 encrypts request 606C and forwards it to external gateway 500. External gateway 500 forwards request 607C to external network 110. If content inspector 410 does not allow the request to be sent, then it may drop the request, or it may respond to the requestor with an error message. If inspection evaluator decides that request 602C does not require content inspection, it bypasses the step of sending the request to content inspector 410 and just forwards it directly to external SSL initiator 510.

Figure 5B:
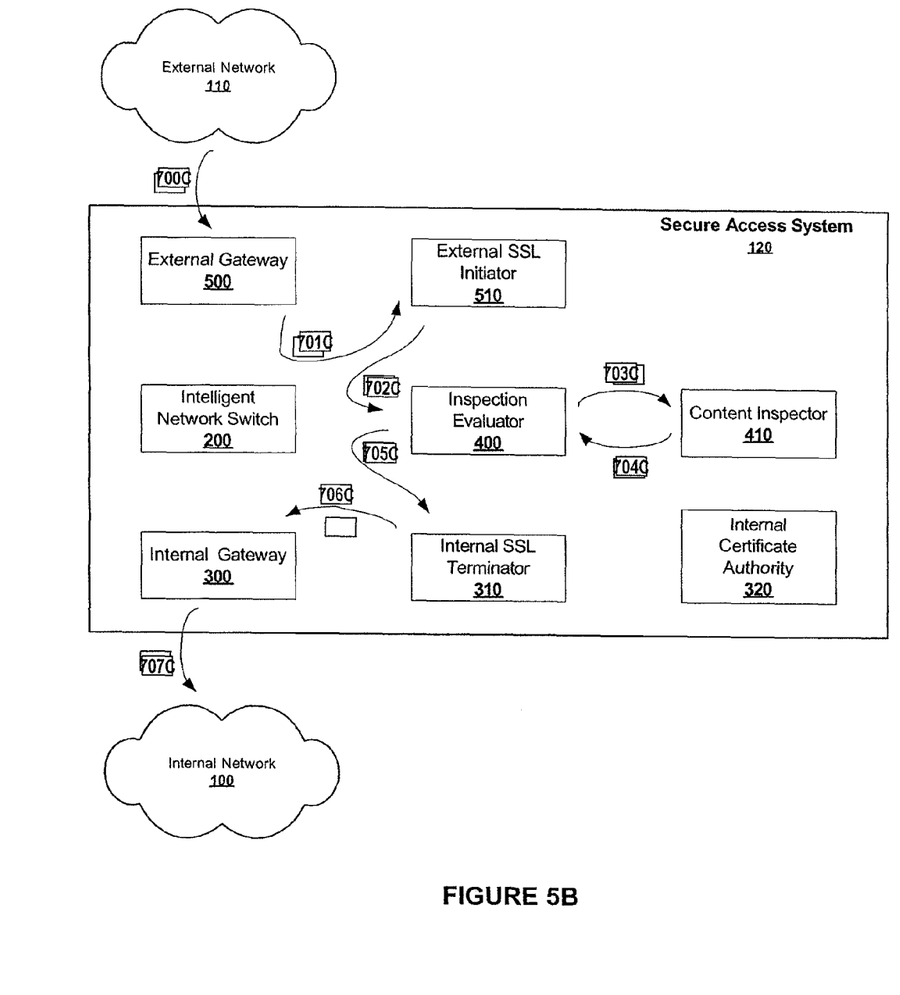

FIG. 5b shows the handling of encrypted responses in system 120. Response 700C arrives from external network 110 to external gateway 500. External gateway 500 recognizes the session as one with encrypted traffic that requires inspection and forwards the response 701C to external SSL initiator 510. External SSL initiator 510 decrypts the response over the SSL session with the server and forwards the clear response 702C to the inspection evaluator 400. Inspection evaluator 400 decides that the response may carry content for inspection, and forwards response 703C to content inspector 410. Content inspector 410 verifies the content, clears it of vulnerabilities (if they exist), and forwards response 704C back to inspection evaluator 400. Inspection evaluator 400 is aware that the response originally came from external SSL initiator 510 and forwards response 705C to internal SSL terminator 310. Internal SSL terminator 310 encrypts the response over the SSL session with the user and forwards the encrypted response 706C to internal gateway 500. Internal gateway 500 forwards response 707C to internal network 100. If content inspector 410 does not allow the response to be sent, then it may drop the response, or it may reset the session on both the client and server side by generating RST packets for the sessions. If inspection evaluator 400 decides that the response 702C does not require content inspection, it bypasses the step of sending the response to content inspector 410 and just forwards it directly to internal SSL terminator 310.

In one embodiment, all traffic between various system components passes through the intelligent network switch 200. Since each unit can contain multiple instances, the intelligent network switch verifies the availability and load of each instance, and distributes the traffic between the available modules. It should be noted that the system can also work without the intelligent network switch, wherein, in this scenario, the units pass all the traffic between one another. It should also be noted that the various system units can be implemented either in software or in hardware, and can also be divided between multiple processors and units. The units can communicate with each other to pass the traffic over any connection including shared memory, local processor bus, and network interfaces.

Figure 6:
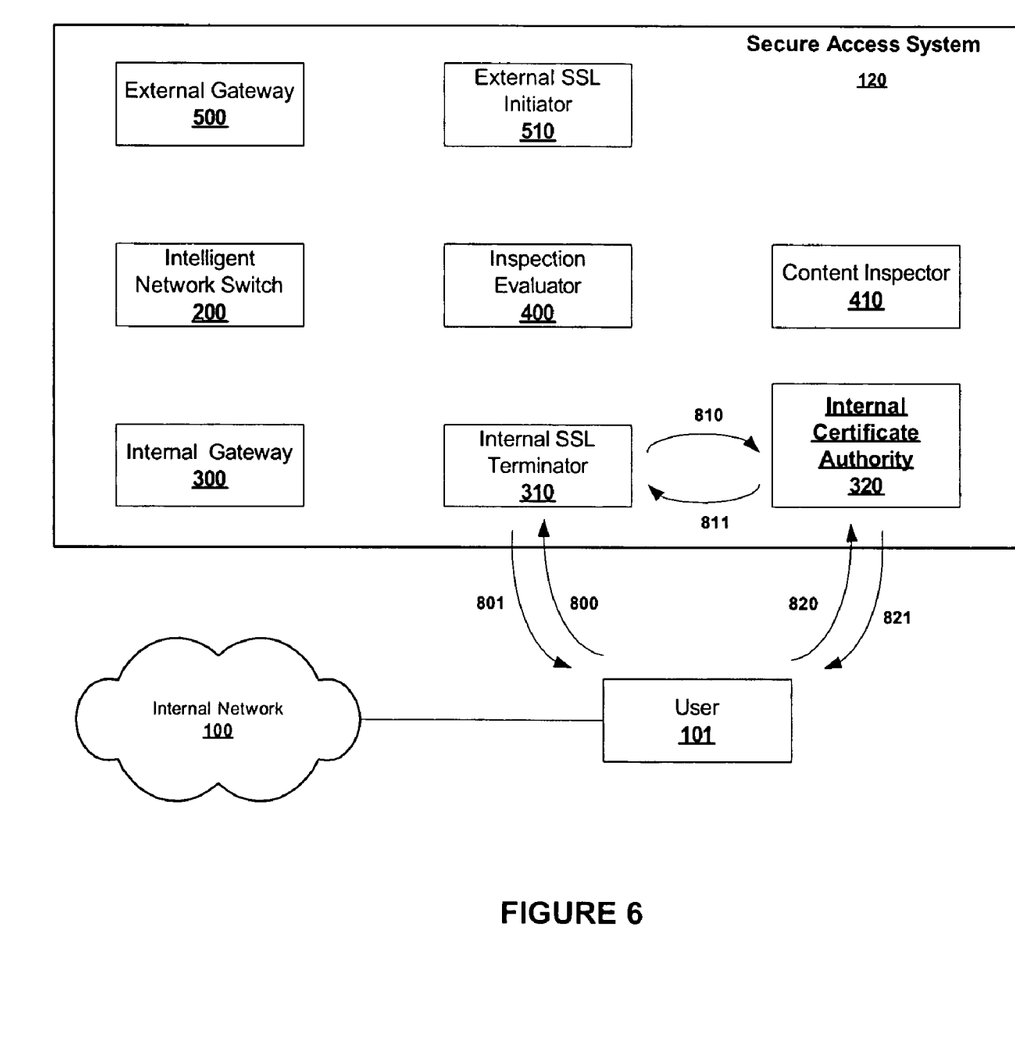
FIG. 6 illustrates the exchange of certificates between a user and the system of the present invention.

FIG. 6 illustrates the exchange of certificates between user 101 and system 120. Internal certificate authority 320 is set up as the certificate authority for the user. Usually, the user keeps all the public keys for his approved certificate authorities. If the user does not have the keys for the internal certificate authority, the user sends request 820 for the certificate authority's public key import. Internal certificate authority 320 responds with its public key 821. When internal SSL terminator 310 generates a public key, it sends a certification request 810 to internal certificate authority 320. Internal certificate authority 320 creates a certificate for the public key and sends certificate 811 to internal SSL terminator 310. When the user opens an encrypted communication 800 with internal SSL terminator 310, it sends its certificate 801 to the user. The user gets the certificate and uses the public key 821 of the internal certificate authority to verify the certificate 811 of internal SSL terminator 310. After verifying the certificate, the user continues with the SSL session.

Table 1 shows the traffic policy table that manages the flow of traffic in the system. Internal gateway 300 holds the traffic classification attributes and the relevant action that the traffic goes through. The first entry in the table represents a policy for traffic coming from departments 1 or 2, with a destination port 80. Such traffic is considered as a clear traffic that requires inspection, so it is set with an action of "inspect". The second entry in the table represents a policy for traffic coming from departments 1 or 2, with a destination port 443. Such traffic is considered as an encrypted traffic that requires inspection, so it is set with an action of "decrypt & inspect". The third entry in the table represents a policy for traffic coming from department 3. Such traffic is considered as trusted traffic that doesn't require any inspection, so it is set with an action of "bypass". Other than the source network and the destination ports, the table can use any attribute of the traffic, like the physical port of the device where traffic is received from, external server or network, and any IP or TCP field value. There are also other mixed options for treating traffic. One example is decrypting the traffic coming from the client side and sending it as clear traffic to the server, in which case there is no need of the External SSL initiator. Another example is encrypting the traffic going to the server although receiving it as clear traffic from the client, in which case there is no need of the Internal SSL terminator.

TABLE 1

Traffic Policy Table

| Physical Ports | Internal Network | External Network | Destination Port | Action |
|---|---|---|---|---|
| Any | departments 1, 2 | Any | 80 | Inspect |
| Any | departments 1, 2 | Any | 443 | decrypt and inspect |
| Any | Department 3 | Any | Any | Bypass |

Table 2 shows the session table that gathers the various sessions that go through the system. The table recalls each session and the treatment it received. The external gateway maintains this table to link the requests that go out to the external networks and the responses that come back from the external network. Then, it makes sure that the response will go through the same inspection process as the request. The first entry in the table shows a session between the client IP address 1.1.1.1 with TCP port 1025 and the server address 102.1.1.1 with TCP port 443. This traffic goes through the decryption process as well as the inspection process. The second entry in the table shows a session between the client IP address 2.1.1.1 with TCP port 1026 and the server address 102.1.1.1 with TCP port 80. This traffic goes through the inspection process only as it is clear traffic. The third entry in the table shows a session between the client IP address 3.1.1.1 with TCP port 1025 and the server address 102.1.1.1 with TCP port 80. This traffic bypasses all the inspection process as it is trusted.

TABLE 2

Session Table

| Source IP | Destination IP | Source Port | Destination Port | Inspected | Encrypted |
|---|---|---|---|---|---|
| 1.1.1.1 | 102.1.1.1 | 1025 | 443 | Yes | Yes |
| 2.1.1.1 | 102.1.1.1 | 1026 | 80 | Yes | No |
| 3.1.1.1 | 102.1.1.1 | 1025 | 80 | No | No |

Table 3 shows the user inspection rules table that controls the inspection requirements of the internal network users and external network servers. The inspection evaluator looks up the user in this table in order to determine which content rules have to be evaluated for the coming traffic. The first entry in the table shows that the relevant policies for users coming from department 1 and going out to any destination in the external network are policies 1, 2 and 3. The second entry in the table shows that the relevant policies for users coming from department 2 and going out to any destination in the external network are policies 4 and 5.

TABLE 3

User Inspection Rule Table

| Internal Network | External Network | Inspection Policies |
|---|---|---|
| department 1 | Any | 1, 2, 3 |
| department 2 | Any | 4, 5 |

Table 4 shows the content inspection policy table that details the inspection policies for the inspection evaluator. This table is referred from the user inspection rules table. The first entry in the table shows that requests for "html" files need to be inspected. The second entry in the table shows that requests for "asp" files need to be inspected. The third entry in the table shows that requests of users that have the parameter field "user" specify the value "gold" need to be inspected no matter what is the file type. The fourth entry shows that requests for content from "www.1.com" need to be inspected. The fifth entry shows that requests for content from "www.2.com" need to be blocked completely.

TABLE 4

Content Inspection Policies Table

| Index | URL | File Type | Parameter Field | Parameter Value | Action |
|---|---|---|---|---|---|
| 1 | Any | html | Any | Any | Inspect |
| 2 | Any | asp | Any | Any | Inspect |
| 3 | Any | Any | user | gold | Inspect |

TABLE 4-continued

Content Inspection Policies Table

| Index | URL | File Type | Parameter Field | Parameter Value | Action |
|---|---|---|---|---|---|
| 4 | www.1.com | Any | Any | Any | Inspect |
| 5 | www.2.com | Any | Any | Any | Block |

Furthermore, although specific entities (e.g., external SSL initiator, internal certificate authority, internal SSL terminator, external gateway, intelligent network switch, and internal gateway, inspection evaluator, and content inspector) are shown in FIGS. 2-6 as being located in one unit (i.e., secure access system 120), it should be noted that it is within the scope of the present invention to have separate or various combinations of specific entities shown in FIGS. 2-6.

Figure 7:
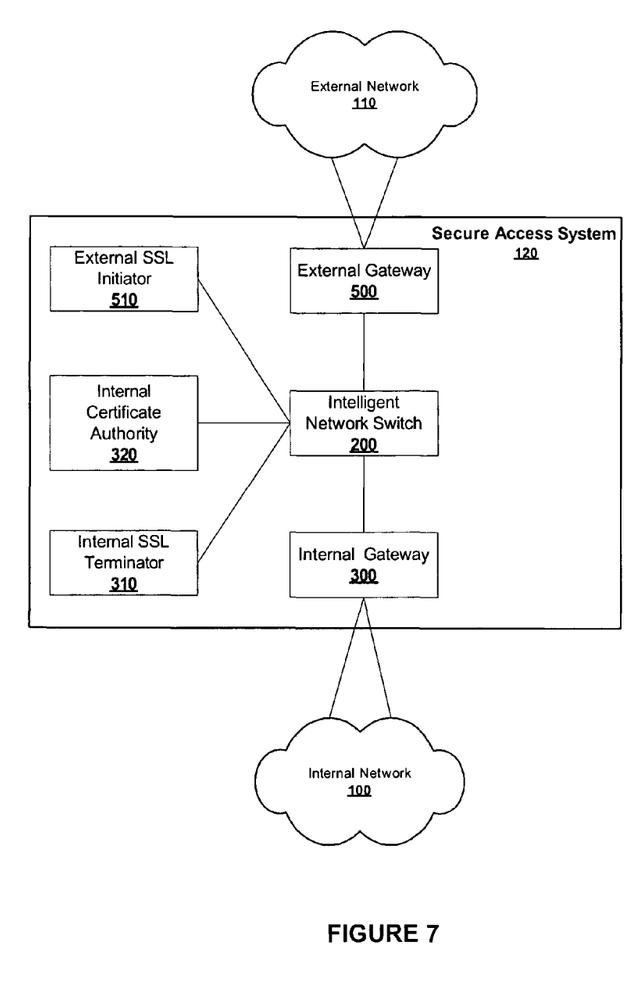
FIG. 7 shows an exemplary embodiment of the present invention wherein the secure access system primarily comprises an external SSL initiator, an internal SSL terminator, an external gateway, and an internal gateway.

FIG. 7 shows an exemplary embodiment of the present invention wherein the secure access system primarily comprises external SSL initiator 510, internal SSL terminator 310, external gateway 500, and internal gateway 300. It should be noted that the inspection evaluator and the content inspector are not part of this embodiment. The secure access system of FIG. 7 connects at least one client of an internal network with at least one remote server of an external network. Specifically, the system as shown in FIG. 7 provides for: (a) an internal gateway 300 communicating with the client; (b) an external gateway 500 communicating with the remote server; (c) an internal encryption terminator 310 establishing a secure connection with said the client and impersonating the remote server (i.e., the internal encryption terminator 310 executes the identity of the remote server by posing as the destination server), decrypting encrypted requests coming from said at least one client and encrypting clear replies going to said at least one client; and (d) an external encryption initiator 510 aiding in establishing a secure connection with the remote server, encrypting clear requests going to the remote server and decrypting encrypted replies coming from the remote server. The system of FIG. 7 can optionally have an internal certificate authority 320 that authorizes the impersonation.

In an extended embodiment, the secure access system of FIG. 7 has multiple instances of any of the following entities: internal gateway, external gateway, internal encryption terminator, and external encryption initiator; wherein the secure access system further comprises an intelligent network switch that distributes network packets based on the availability and load of each instance.

Figure 8:
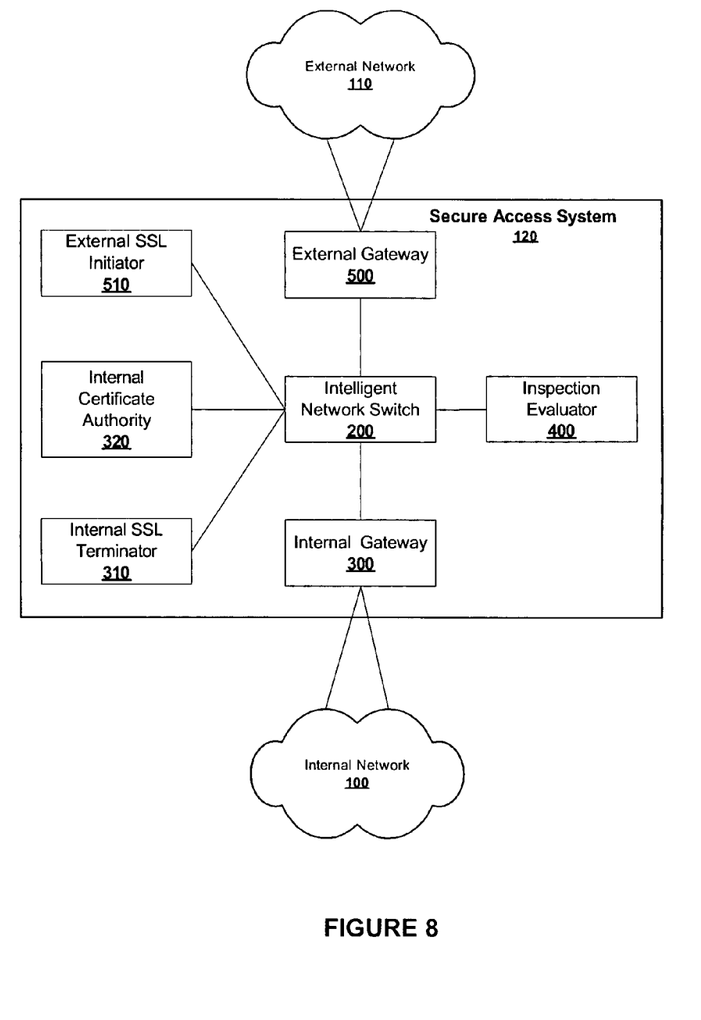
FIG. 8 shows another embodiment of the present invention wherein the secure access system primarily comprises an external SSL initiator, an internal SSL terminator, an external gateway, an internal gateway, and an inspection evaluator.

FIG. 8 shows another embodiment of the present invention wherein the secure access system primarily comprises external SSL initiator 510, internal SSL terminator 310, external gateway 500, internal gateway 300, and inspection evaluator 400. It should be noted that the content inspector is not part of this embodiment. Specifically, the system as shown in FIG. 8 provides for: (a) an internal gateway 300 communicating with the client; (b) an external gateway 500 communicating with the remote server; (c) an internal encryption terminator 310 establishing a secure connection with said the client and impersonating the remote server (i.e., the internal encryption terminator 310 executes the identity of the remote server by posing as the destination server), decrypting encrypted requests coming from said at least one client and encrypting clear replies going to said at least one client; (d) an external encryption initiator 510 aiding in establishing a secure connection with the remote server, encrypting clear requests going to the remote server and decrypting encrypted replies coming from the remote server; and (e) an inspection evaluator that aids in determining if packets need to be forwarded immediately, blocked completely, or whether packets require full content inspection. The system of FIG. 8 can optionally have an internal certificate authority 320 that authorizes the impersonation.

Additionally, the present invention provides for an article of manufacture comprising computer readable program code contained within implementing one or more modules to inspect encrypted content in a secure network. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: a first module working in conjunction with an internal gateway communicating with an internal network; a second module working in conjunction with an external gateway communicating with an external network; a third module implementing an internal certificate authority that authorizes requests for certificates originating from said internal network without contacting an external certifying authority; a fourth module implementing an internal SSL terminator that aids the internal gateway in decrypting encrypted traffic coming from the internal network and encrypting clear traffic going to the internal network; a fifth module implementing an external SSL initiator that aids the external gateway in decrypting encrypted traffic coming from the external network and encrypting clear traffic going to the external network; a sixth module implementing an inspection evaluator that aids in the reception of packets of data from one gateway and forwards inspected data to another gateway, wherein the inspection evaluator module further evaluates the data and determines whether traffic requires full content inspection; and a seventh module implementing a content inspection unit that inspects the full data to validate it

CONCLUSION

A system and method has been shown in the above embodiments for the effective implementation of content inspection in secure networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware. All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the networking.

The invention claimed is:

1. A secure access system connecting at least one client of an internal network with at least one remote server of an external network, said system comprising:
   an internal gateway communicating with said at least one client, wherein the internal gateway is communicatively coupled to an internal network;
   an external gateway communicating with said at least one remote server of the external network;
   an internal encryption terminator comprising a secure socket layer (SSL/TLS) gateway establishing a first secure connection with said at least one client via the internal gateway, the internal encryption terminator impersonating said at least one remote server by using a certificate with a server identity related to the at least one remote server; and
   an external encryption initiator comprising another secure socket layer (SSL/TLS) gateway configured to establish a second secure connection with said at least one remote server of the external network;
   wherein the internal encryption terminator decrypts an encrypted request coming from said at least one client over said first secure connection and the external encryption initiator re-encrypts the request going to the at least one remote server over said second secure connection,
   wherein the external encryption initiator decrypts an encrypted reply coming from said at least one remote server over said second secure connection and the internal encryption terminator re-encrypts the reply going to the at least one client over the first secure connection, and
   wherein the certificate is internally generated independently from the remote server.

2. A secure access system as per claim 1, wherein said system further comprises an internal certificate authority that authorizes said certificate.

3. A secure access system as per claim 1, wherein said system further comprises a content inspection unit inspecting non-encrypted requests and replies before they are forwarded to either the internal or external gateway.

4. A secure access system as per claim 1, wherein said system comprises multiple instances of any of said internal gateway, said external gateway, said internal encryption terminator, and said external encryption initiator, and said system further comprises an intelligent network switch that distributes network packets based on the availability and load of each instance.

5. A secure access system as per claim 1, wherein said system maintains a traffic policy table holding traffic classification attributes to manage flow of network traffic by identifying non-encrypted and encrypted traffic.

6. A secure access system as per claim 5, wherein said traffic policy table comprises any of the following attributes: physical ports, internal network addresses, external network addresses, destination port numbers, and type of action.

7. A secure access system as per claim 1, wherein said system maintains a session table having information associated with communication between said at least one client and said at least one remote server, said session table being used in future routing network packets.

8. A secure access system as per claim 7, wherein said session table comprises any of the following entries: source IP address, destination IP address, source port number, destination port number, inspection status, and encryption status.

9. A secure access system as per claim 1, wherein said external network is the Internet.

10. A secure access system as per claim 1, wherein said internal network is a private LAN.

11. A secure access system as per claim 1, wherein said system maintains an inspection rule table and determines whether packets need to be forwarded immediately, blocked completely, or whether packets require full content inspection.

12. A secure access system as per claim 11, wherein said inspection rule table comprises any of the following entries: source network addresses, destination network addresses, URL, file type, parameter field name, parameter field value, and action.

13. A secure access system connecting an internal network to an external network, said system comprising:
- an internal gateway communicating with said at least one client, wherein the internal gateway is communicatively coupled to an internal network;
- an external gateway communicating with said at least one remote server of the external network;
- an internal encryption terminator, comprising a secure socket layer (SSL/TLS) gateway, establishing a first secure connection with said at least one client via the internal gateway, the internal encryption terminator impersonating said at least one remote server by using a certificate with a server identity related to the at least one remote server;
- an external encryption initiator comprising another secure socket layer (SSL/TLS) gateway configured to establish a second secure connection with said at least one remote server of the external network; and
- an internal certificate authority that authorizes said certificate,
- wherein the internal encryption terminator decrypts an encrypted request coming from said at least one client over said first secure connection and the external encryption initiator re-encrypts the request going to the at least one remote server over said second secure connection,
- wherein the external encryption initiator decrypts an encrypted reply coming from said at least one remote server over said second secure connection and the internal encryption terminator re-encrypts the reply going to the at least one client over the first secure connection, and
- wherein the certificate is internally generated independently from the remote server.

14. A secure access system as per claim 13, wherein said system maintains a traffic policy table holding traffic classification attributes to manage flow of network traffic by identifying non-encrypted and encrypted traffic.

15. A secure access system as per claim 14, wherein said traffic policy table comprises any of following attributes: physical ports, internal network addresses, external network addresses, destination port numbers, and type of action.

16. A secure access system as per claim 13, wherein said system maintains a session table having information associated with communication between said at least one client and at least one remote server, said session table being used in future routing network packets.

17. A secure access system as per claim 16, wherein said session table comprises any of following entries: source IP address, destination IP address, source port number, destination port number, inspection status, and encryption status.

18. A secure access system as per claim 13, wherein said system comprises multiple instances of said internal gateway, said external gateway, said internal encryption terminator, and said external encryption initiator, and said system further comprises an intelligent network switch that distributes network packets based on the availability and load of each instance.

19. A secure access system as per claim 13, wherein said external network is the Internet.

20. A secure access system as per claim 13, wherein said internal network is a private LAN.

21. A secure access system as per claim 13, wherein said system maintains an inspection rule table and determines whether packets need to be forwarded immediately, blocked completely, or whether packets require full content inspection.

22. A secure access system as per claim 21, wherein said inspection rule table comprises any of the following entries: source network addresses, destination network addresses, URL, file type, parameter field name, parameter field value and action.

23. An article of manufacture comprising a non-transitory computer readable medium product implementing content inspection in communication sessions between at least one client of an internal network and at least one remote server of an external network, said medium comprising:
- a first module implementing an internal gateway in the internal network for communicating with said at least one client;
- a second module implementing an external gateway in the external network for communicating with said at least one remote server;
- a third module implementing an internal encryption terminator, comprising a secure socket layer (SSL/TLS) gateway, said third module aiding in establishing a first secure connection with said at least one client via the internal gateway, the internal encryption terminator impersonating said at least one remote server by using a certificate with a server identity related to the at least one remote server;
- a fourth module implementing an external encryption initiator comprising another secure socket layer (SSL/TLS) gateway configured to establish a second secure connection with said at least one remote server of the external network; and
- a fifth module implementing an internal certificate authority that authorizes said certificate,
- wherein the internal encryption terminator decrypts an encrypted request coming from said at least one client over said first secure connection and the external encryption initiator re-encrypts the request going to the at least one remote server over said second secure connection,
- wherein the external encryption initiator decrypts an encrypted reply coming from said at least one remote server over said second secure connection and the internal encryption terminator re-encrypts the reply going to the at least one client over the first secure connection, and
- wherein the certificate is internally generated independently from the remote server.

24. An article of manufacture as per claim 23, wherein said medium maintains a traffic policy table holding traffic classification attributes to manage flow of network traffic by identifying non-encrypted and encrypted traffic.

25. An article of manufacture as per claim 24, wherein said traffic policy table comprises any of the following attributes: physical ports, internal network addresses, external network addresses, destination port numbers, and type of action.

26. An article of manufacture as per claim 23, wherein said medium maintains a session table having information associated with communication between said at least one client and said at least one remote server, said session table being used in future routing network packets.

27. The article of manufacture as recited in claim 26, wherein said session table comprises any of the following attributes: source EP address, destination IP address, source port number, destination port number, inspection status, and encryption status.

* * * * *